Oct. 28, 1969   R. E. ELLIOTT   3,474,808
HIGH PRESSURE VALVE FOR RECIPROCATING PUMPS
Filed April 5, 1967

INVENTOR,
ROBERT E. ELLIOTT
BY
*Head & Johnson*
ATTORNEYS

United States Patent Office 3,474,808
Patented Oct. 28, 1969

3,474,808
HIGH PRESSURE VALVE FOR RECIPROCATING PUMPS
Robert E. Elliott, Tulsa, Okla., assignor to FWI, Inc., Tulsa, Okla., a corporation of Oklahoma
Filed Apr. 5, 1967, Ser. No. 628,685
Int. Cl. F16k 15/06, 1/44
U.S. Cl. 137—543                                      3 Claims

ABSTRACT OF THE DISCLOSURE

This invention provides a high pressure valve for reciprocating pumps characterized by a cylindrical seat element having a bore therethrough and defined in part by a truncated conical interior seating surface, a unitary axially symmetrical valve element including a truncated conical seating surface sealably engageable with the seat element seating surface and including a circumferential groove in said seating surface, a torous non-metallic ring seal member positioned in the circumferential groove of the valve element sealably engaging the seating surface of the seat element when the valve is in closed position and retaining means permitting limited longitudinal displacement of the valve element to permit fluid to flow through the valve in one direction and prohibit fluid flow in the opposite direction.

Summary

The invention provides a valve useful in high pressure reciprocating pumps. The chief problem with high pressure reciprocating pumps is providing a valve which will seal under high fluid pressures but which is not disintegrated by the forces of fluid flow. Many valves have been designed in an attempt to include resilient seating means for high pressure application including arrangements wherein sealing means are positioned between elements held together by various threaded parts, but these have not proven to be satisfactory since they cannot withstand the forces of high pressure applications. This invention provides a valve unique by the arrangement wherein the valve element itself is of a unitary one piece axially symmetrical configuration. This obviates the necessity of accurate machining and aligning an assembly of elements. In the valve of this invention a torous O-ring seal resiliently retained within a groove provides a resilient seating unitary valve element able to withstand the forces which act upon it in high pressure reciprocating pump applications.

Description of views

Detailed description

Figure 1:
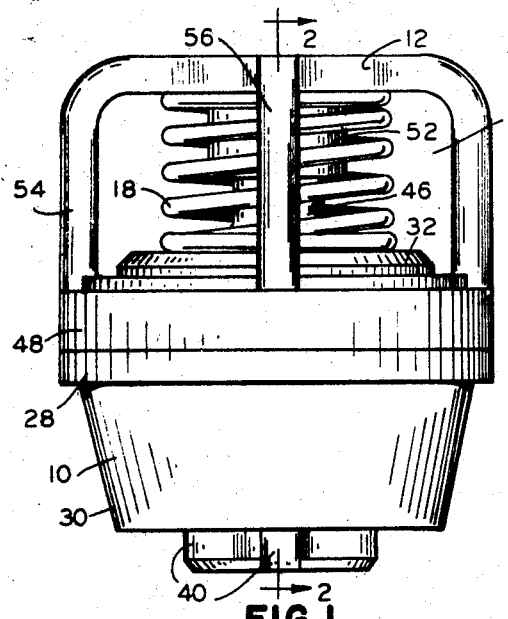
FIGURE 1 is an external view of the valve of this invention as utilized in high pressure reciprocating pump applications. The valve is typically seated in a cylinder head or fluid end of a reciprocating pump in a tapered seat.
Figure 2:
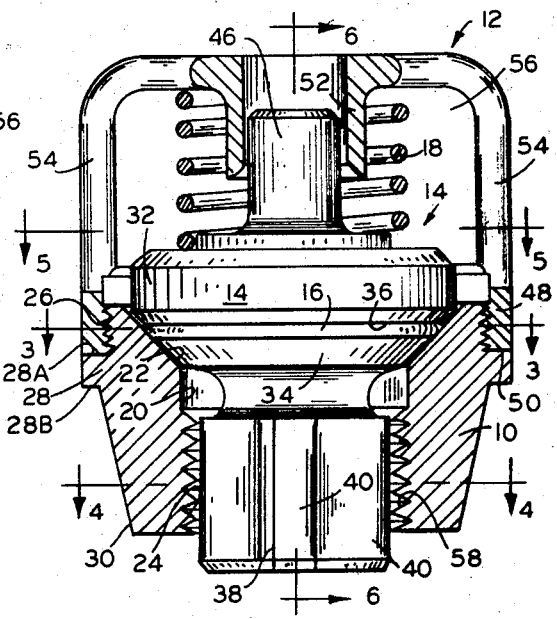
FIGURE 2 is a cross-sectional view taken along the line 2—2 of FIGURE 1 showing the internal construction of the valve.
Figure 5:
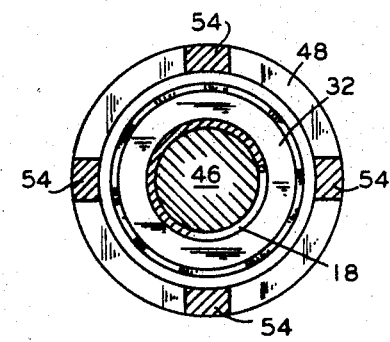
FIGURE 5 is a cross-sectional view of the upper portion of the valve taken along the line 5—5 of FIGURE 2.
Figure 3:
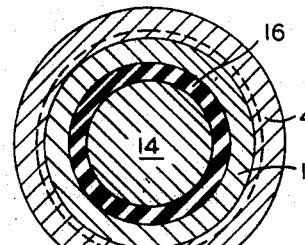
FIGURE 3 is a cross-sectional view of the center portion of the valve taken along the line 3—3 of FIGURE 2.
Figure 4:
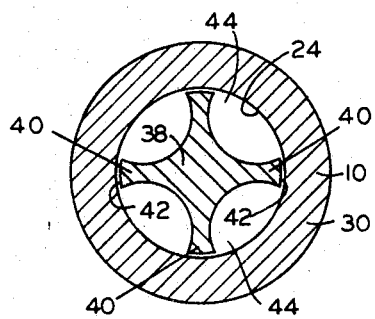
FIGURE 4 is a cross-sectional view of the lower portion of the valve taken along the line 4—4 of FIGURE 2.

Referring first to FIGURES 1 and 2, an exemplification of the invention is shown. The valve consists basically of a seat element 10, a retainer element 12, a valve element 14, a torous non-metallic resilient seal 16 and a coiled compressed spring 18. These five elements make up the valve and an important part of the invention is the ultimate simplicity and symmetry of the valve arranged in a way wherein the valve can accept the forces acting upon it in high pressure application and perform for a long and effective life.

The seat element 10 is basically a cylindrical element having a bore 20 therethrough. It is further defined by a truncated conical interior seating surface 22 at one end and a reduced internal diameter cylindrical guide bore 24 at the opposite end. The exterior of the cylindrical seat element 10 includes a reduced diameter threaded upper portion 26, an enlarged diameter planar surfaced seating shoulder 28 perpendicular the seat element axis, and a reduced diameter tapered external seating portion 30 at the opposite end. Seating shoulder 28 defines an upper planar seating surface 28A and a lower planar seating surface 28B. The lower seating surface 28B serves as a means of seating the valve in a cylinder head or fluid end of the reciprocating high pressure pump.

Figure 6:
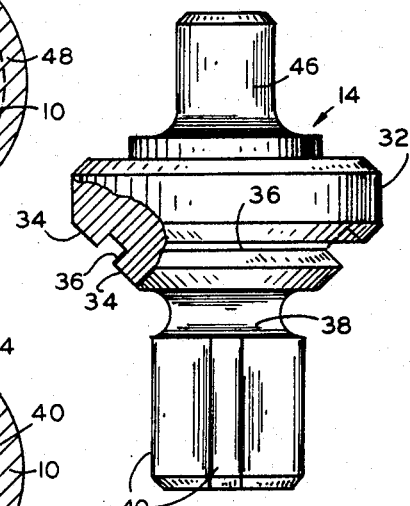
FIGURE 6 is an external view, shown partially cut away, of the valve element of the invention.

The valve element 14 is defined by an enlarged diameter cylindrical portion 32 having a truncated conical seating portion 34 configured to conform to and seal against the truncated conical interior seating surface 22 of the seat element 10. The truncated conical seating surface 34 of valve element 14 includes a circumferential groove 36 (see FIGURE 6) in which is expandably positioned the torous non-metallic resilient seal 16. The seal 16 is of a normal circumferential diameter slightly less than the minimum diameter of the groove 36 so that it is held in the groove by its own internal tension. If required the seal 16 may be warmed to increase its elasticity to augment placing it in the groove 36.

The seal 36 has two basic functions. First, it reduces the shock of closing of the valve, that is, seating surface 34 closes less violently against the seat element seating surface 32, thereby reducing the battering of these two metallic elements. Second, the seal 16 improves the sealing relationship between the two sealing surfaces when the valve is in closed position thereby preventing leakage of the valve. The resilient seal compensates for any slight distortion which might take place in the valve elements under high fluid pressure.

Integrally formed as part of the valve element 14 is a first axial reduced diameter guide portion 38 at one end which is slidably received by the internal cylindrical guide portion 24 of the seat element 10. In the preferred embodiment illustrated the first guide portion 38 is defined by at least three (four are shown in the illustrated embodiment) integral wing portions 40 which extend radially about the valve element axis. The outer edge 42 of the wing portions 40 generate a cylinder of a diameter less than the internal diameter of the guide bore 24. The wing portions 40 provide fluid flow paths 44 therebetween.

The valve element 14 includes a second integral axial reduced diameter guide portion 46 at the end opposite the first guide portion 38.

The valve element 14 is completely axially symmetrical throughout. Thus the accurate manufacturing of the device is relatively easily accomplished as it does not require the alignment of threaded components.

The unitary retainer element 12 includes a cylindrical base portion 48 having a perpendicular seating face 50 which engages the upper planar surface 28A of the seat element seating shoulder 28. The cylindrical base portion 48 is internally threaded and threadably engages the threads 26 at the upper end of the seat element 10.

The retainer element 12 further includes a reduced diameter tubular guide portion 52 which is spaced from and coaxial with the cylindrical base portion 48, and the bore 20 and guide bore 24 of the seating element 10.

The upper tubular guide portion 52 slidably receives the second integral guide portion 46 of valve element 14. A web portion 54 integrally supports the upper guide portion 52 to the cylindrical base portion 48 and provides fluid flow paths 56 therebetween.

The coil spring 18 is compressibly positioned concentrically around the tubular guide portion 52 of the retaining element 12 and the second guide portion 46 of the valve element 14. Spring 18 functions to urge the valve element 14 towards closed position, the force of the spring being overcome in operation by fluid pressure permitting the valve to open as fluid is forced through the valve by the reciprocating pump in which the valve is used.

In order to facilitate removal of the seat element 10 from the pump head or fluid end in which it is utilized the guide bore 24 may be, as shown, provided with internal threads 58 so that a bolt or other element may be threaded into the seat 10 to facilitate the seat being pulled from its position.

While the invention has been described in substantial detail it is understood that the description has been made with reference to a specific exemplified embodiment of the invention and that the invention is not to be limited to the embodiment illustrated, nor to the abstract and summary of the invention herein, but the invention is to be interpreted only by the scope of the claims.

What is claimed is:

1. A high pressure valve for reciprocating pumps comprising:
    a cylindrical seat element having a bore therethrough defined by a truncated conical interior seating surface at one end and a reduced internal diameter cylindrical guide bore at the opposite end, the exterior of the seat element being defined by a reduced diameter portion at one end, an intermediate enlarged diameter opposed surface planar seating shoulder perpendicular the seat element axis, and a reduced diameter portion at the opposite end having external threads thereon;
    an axially symmetrical valve element defined by an enlarged diameter cylindrical portion having a truncated conical seating surface configured to conform to said truncated conical interior seating surface of said seat element, said truncated conical seating surface having a circumferential groove therein, a first integral axial reduced diameter guide portion at one end slidably received by said internal cylindrical guide portion of said seat element, and a second integral axial reduced diameter guide portion at the other end;
    a unitary retainer element defined by a cylindrical base portion having perpendicular seating face and a threaded bore therethrough engaging said threaded portion of said seat element, said perpendicular seating face engaging one of the planar surfaces of said seat shoulder element, said retainer element including a reduced diameter tubular guide portion spaced from and concentric with said base portion, the bore of said tubular guide portion slidably receiving said second integral guide portion of said valve element, and said retainer element having a web portion integrally supporting said guide portion to said base portion and providing flow passageways therethrough said reduced internal guide portion of said seat element being internally threaded; and
    a torous non-metallic resilient ring seal member positioned in said circumferential groove of said valve element, and engaging, when the valve is in closed position, said seating surface of said seat element.

2. A high pressure valve for reciprocating pumps according to claim 1 including a coiled spring received about said tubular guide portion of said retainer element and compressibly engaging said retainer element and said enlarged diameter cylindrical portion of said valve element to normally urge said valve element into closed position.

3. A high pressure valve for reciprocating pumps according to claim 1 wherein said first axial guide portion of said valve element is defined by at least three integral wing portions extending radially about the valve element axis, the outer edge of said wing portions generating a cylinder of diameter less than the internal diameter of said cylindrical guide bore of said seat element, the space between said radial wing portions providing fluid flow paths.

References Cited

UNITED STATES PATENTS

| | | | |
|---|---|---|---|
| 143,345 | 9/1873 | Harrington et al. | 137—533.25 |
| 243,256 | 6/1881 | Heylmun | 137—543 X |
| 2,327,600 | 8/1943 | Kennon | 137—543 X |
| 2,594,641 | 4/1952 | Griffith et al. | 137—543 |
| 2,776,056 | 1/1957 | Douglass | 137—327 X |
| 2,804,281 | 8/1957 | Osburn | 137—543 X |
| 2,969,804 | 1/1961 | Tolkien | 137—454.4 X |

WILLIAM F. O'DEA, Primary Examiner

DENNIS H. LAMBERT, Assistant Examiner

U.S. Cl. X.R.

137—327, 454.4